United States Patent
Swales et al.

(10) Patent No.: US 12,545,097 B1
(45) Date of Patent: Feb. 10, 2026

(54) HYBRID VEHICLE TRANSMISSIONS WITH TRANSFER GEARS SUPPORTED ON INVERTED BEARING MOUNTS FOR REDUCED BEARING LOSS

(71) Applicant: GM GLOBAL TECHNOLOGY OPERATIONS LLC, Detroit, MI (US)

(72) Inventors: Shawn H. Swales, Farmington, MI (US); James M. Hart, Belleville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 18/973,844

(22) Filed: Dec. 9, 2024

(51) Int. Cl.
   B60K 6/365 (2007.10)

(52) U.S. Cl.
   CPC .................. B60K 6/365 (2013.01)

(58) Field of Classification Search
   CPC .. B60K 6/365; B60K 1/02; F16H 3/72; F16H 3/727
   See application file for complete search history.

(56) References Cited

U.S. PATENT DOCUMENTS

| | | | |
|---|---|---|---|
| 1,001,261 A | 8/1911 | Forth | |
| 6,478,705 B1 | 11/2002 | Holmes | |
| 6,527,658 B2 | 3/2003 | Holmes | |
| 7,022,038 B2 | 4/2006 | Schmidt | |
| 7,217,211 B2 | 5/2007 | Klemen | |
| 7,427,252 B2 | 9/2008 | Holmes | |
| 7,544,141 B2 | 6/2009 | Holmes | |
| 8,317,648 B2 | 11/2012 | Robinette | |
| 8,585,520 B2 | 11/2013 | Turnbull | |
| 8,905,885 B2* | 12/2014 | Yamamoto | B60K 6/365 184/6.12 |
| 9,840,140 B1* | 12/2017 | Holmes | F16H 3/728 |
| 9,933,066 B2* | 4/2018 | Sada | F16H 57/04 |
| 10,017,045 B1* | 7/2018 | Swales | B60K 6/54 |
| 10,854,933 B2 | 12/2020 | Hao | |
| 2001/0051556 A1 | 12/2001 | Takenaka | |
| 2003/0064846 A1 | 4/2003 | Klemen et al. | |

(Continued)

FOREIGN PATENT DOCUMENTS

| | | |
|---|---|---|
| DE | 69737312 T2 | 3/2007 |
| DE | 102014117744 A1 | 3/2016 |

(Continued)

Primary Examiner — Derek D Knight
(74) Attorney, Agent, or Firm — Quinn IP Law

(57) ABSTRACT

An electrically variable transmission includes an output shaft that drivingly connects to a hybrid vehicle's final drive system and an input shaft that drivingly connects to an engine. A transfer gear set drivingly connects to both the output shaft and a first motor. A rolling bearing includes an inner race circumscribed by an outer race, which is rigidly attached to the transmission's housing. A planetary gear set includes a sun gear that drivingly connects to a second motor, a ring gear drivingly connected to the transfer gear set, and a planet carrier drivingly connected to the input shaft. Located radially inward of the transfer gear set is an inverted bearing mount device that includes an annular outer disk, which is rigidly attached to the ring gear, and a cylindrical central hub, which projects axially from the outer disk and is rigidly attached to the inner race of the rolling bearing.

20 Claims, 2 Drawing Sheets

(56) References Cited

U.S. PATENT DOCUMENTS

| | | |
|---|---|---|
| 2015/0045179 A1 | 2/2015 | Okuwaki |
| 2015/0226297 A1 | 8/2015 | Knoblauch |
| 2015/0300461 A1 | 10/2015 | Tamai |
| 2015/0314770 A1 | 11/2015 | Kitabatake |
| 2016/0146332 A1 | 5/2016 | Taniguchi |
| 2016/0265652 A1 | 9/2016 | Nishimine |
| 2016/0375754 A1 | 12/2016 | Kurosaki |
| 2017/0299055 A1 | 10/2017 | Tomita |
| 2018/0112740 A1 | 4/2018 | Matsumoto |
| 2025/0242675 A1 | 7/2025 | Yamasaki |

FOREIGN PATENT DOCUMENTS

| | | |
|---|---|---|
| JP | 2009286367 A | 12/2009 |
| JP | 2014024412 A | 2/2014 |
| JP | 2014052065 A | 3/2014 |
| JP | 20220077781 | 5/2022 |

* cited by examiner

HYBRID VEHICLE TRANSMISSIONS WITH TRANSFER GEARS SUPPORTED ON INVERTED BEARING MOUNTS FOR REDUCED BEARING LOSS

INTRODUCTION

The present disclosure relates generally to vehicle powertrains. More specifically, aspects of this disclosure relate to hybrid electric vehicle powertrains with two-motor, single-engine electrically variable transmissions that provide power split operation.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and Wankel-type rotary engines, as some non-limiting examples. Hybrid-electric and full-electric vehicles (collectively "electric-drive vehicles"), on the other hand, utilize alternative power sources to propel the vehicle and, thus, minimize or eliminate reliance on a fossil-fuel based engine for tractive power.

A full-electric vehicle (FEV)—colloquially labeled an "electric car"—is a type of electric-drive vehicle configuration that altogether omits an internal combustion engine and attendant peripheral components from the powertrain system, relying instead on a rechargeable energy storage system (RESS) and a traction motor for vehicle propulsion. The engine assembly, fuel supply system, and exhaust system of an ICE-based vehicle are replaced with a single or multiple traction motors, rechargeable battery cells, and battery cooling and charging hardware in a battery-based FEV. Hybrid-electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

There are three primary types of hybrid powertrain architectures used in contemporary automobiles: series hybrid, parallel hybrid, and series-parallel ("power-split") hybrid configurations. Series hybrid powertrain architectures—also known as Extended-Range Electric Vehicles (EREV)—derive all tractive power from electric motors and, thus, eliminate any driving mechanical connection between the engine and the final drive members. In this case, the power transmission is wholly eliminated from the vehicle powertrain and the engine functions solely as a regenerative energy source that drives an electric generator for powering the motors. Parallel hybrid architectures, in contrast, have torque-transmitting mechanical connections that drivingly couple the engine and motor(s) to the vehicle's road wheels. As the name implies, series-parallel hybrid architectures combine features from both parallel hybrid and series hybrid powertrains. With gas-only, electric-only, and motor-assist operating modes, the motor and engine work independently or jointly—in parallel or in series—depending on the desired vehicle speed, overall vehicle power demand, and state-of-charge (SOC) of the battery pack(s).

Power-split HEV powertrains may utilize an electrically variable transmission (EVT) to provide for continuously variable speed ratios during gas-only and motor-assist operating modes. The EVT provides the direct mechanical paths between the internal combustion engine and the vehicle's final drive to enable relatively high transmission efficiency and the application of lower cost, less massive motor hardware. The EVT may also be operable with engine operation that is mechanically independent from the final drive in various mechanical/electrical split contributions, thereby enabling high-torque continuously-variable speed ratios, electrically dominated launches, regenerative braking, and engine-off idling. The EVT may use differential gearing to achieve continuously variable torque and speed ratios between input and output without sending all power through the variable elements. For instance, the EVT may utilize an epicyclic "planetary gear" arrangement to send a fraction of its transmitted power through the motor/generator(s); the remainder of its power is sent through another, parallel path that is mechanical and direct (i.e., "fixed ratio"), or alternatively selectable. Multimode EVTs utilize torque fixing devices, such as clutch and brakes, to selectively activate the differential gear elements for establishing desired forward and reverse speed ratios. Conversely, a single-mode EVT omits torque clutch devices to provide only a power-split operating mode for the engine.

SUMMARY

Presented below are hybrid electric vehicle transmissions with transfer gears supported on inverted bearing mounts for reduced bearing loss, methods for making and methods for using such HEV transmissions, and hybrid vehicles equipped with such transmissions. In an example, there are presented two-motor, single-engine electrified continuously variable transmissions (eCVT) for hybrid electric vehicles. Disclosed concepts may be particularly useful for single-mode, power-split HEV eCVT architectures having a planetary gear system with an intermediate "planet carrier" assembly drivingly connected to an engine-side (ICE) input shaft, a central "sun" gear drivingly connected to a motor-side (Motor A) input shaft, and an outer "ring" gear drivingly connected to a transmission output shaft. With this arrangement, the ring gear may be on the same lever node as a transfer gear, which drivingly connects to a second motor-side (Motor B) input shaft. In a front-wheel drive (FWD) powertrain layout, the transfer gear may be part of a layshaft gear train that is regularly subject to radial gear reaction loads. An optional park lock gear may be advantageously combined with the transfer and ring gear assembly and, thus, may also experience radial loading.

Discussed below are inverted bearing mount (iBM) devices that provide enhanced radial support for the transfer gear, ring gear, and (when present) park lock gear while reducing bearing loss at the input-shaft and ring-gear support bearings for all-electric range (AER) with a resultant improvement in fuel economy. The iBM device is packaged inside the transmission case, radially interposed between the engine-side input shaft and the intermeshed ring gear and transfer gear assembly. A radially outer end of the iBM device may be press-fit, slip fit, shrink fit, welded, splined, integrally forged, etc. (collectively "rigidly attached") to an inner surface of the ring gear, while a radially inner end of the iBM device may be rigidly attached to an inner race of a first bearing (e.g., high-speed, deep-groove ball bearing). An outer race of the ball bearing may be rigidly attached directly to the transmission case, radially inward of the transfer gear. In so doing, the iBM device structurally supports the transfer gear and ring gear on the inner race of the roller bearing. The radially inner end of the iBM device may rigidly attach to a second bearing (e.g., high-speed, caged cylindrical roller bearing) that supports thereon the engine-side input shaft such that the relative speed of this bearing during engine-on operation is reduced.

Aspects of this disclosure are directed to HEV transmissions with transfer gears that are supported on load-transmitting bearing mounts for reduced bearing loss. In an example, an electrically variable transmission assembly is presented for a hybrid vehicle. The EVT assembly includes a protective transmission case that mounts to the hybrid vehicle, for example, via bushings and bolts that secure the case to a transmission mount on the vehicle chassis. Rotatably mounted within the transmission case are an output shaft, which drivingly connects to a final drive system, an input shaft, which drivingly connects to a crankshaft of an engine, and a transfer gear set, which drivingly connects to the output shaft and a motor shaft of a first motor. Concentric with the input shaft is a first bearing that includes an inner race circumscribed by an outer race, which is rigidly attached to the transmission case. A planetary gear set is located inside the transmission case and includes a sun gear, which is concentric with and drivingly connects to a motor shaft of a second motor, a ring gear, which is concentric with the sun gear and drivingly connected to the transfer gear set, and a planet carrier, which is concentric with and drivingly connected to the input shaft. The planet carrier rotatably supports multiple planet gears that intermesh with both the sun and ring gears. Located inside the transmission case, radially inward of the transfer gear set, is an inverted bearing mount device that includes an annular outer disk and a cylindrical central hub that projects axially from the outer disk. The outer disk rigidly attaches to the ring gear (e.g., via splines or as an integral structure), and the cylindrical central hub rigidly attaches to the inner race of the first bearing (e.g., via press fit).

Additional aspects of this disclosure are directed to motor vehicles equipped with dual-motor, single-engine HEV EVT transmissions with intermeshed transfer gear and ring gear assemblies that are supported on rigid bearing mounts for reduced bearing loss. As used herein, the terms "vehicle" and "motor vehicle" may be used interchangeably and synonymously to include any relevant vehicle platform, such as passenger vehicles, commercial vehicles, industrial vehicles, tracked vehicles, off-road and all-terrain vehicles (ATV), farm equipment, watercraft, aircraft, spacecraft, etc. In an example, a hybrid vehicle includes a vehicle body with a passenger cabin, multiple road wheels rotatably mounted to the vehicle body (e.g., via wheel corner modules coupled to a unibody or body-on-frame chassis), and other standard original equipment. Attached to the vehicle body to propel the HEV are an internal combustion engine assembly and a pair of (first and second) electric traction motors. The ICE assembly includes a crankshaft for outputting engine torque generated by the ICE assembly, and each traction motor includes a respective motor shaft for outputting motor torque generated by that motor.

Continuing with the discussion of the foregoing example, the hybrid vehicle also includes an EVT assembly with a protective transmission case that is mounted inside the vehicle body. Rotatable within the transmission case are an output shaft that is drivingly connected to the vehicle's final drive system, an input shaft that is drivingly connected to the ICE's crankshaft, and a transfer gear set that is drivingly connected to the output shaft and the motor shaft of the first electric motor. A first bearing includes an inner race that is concentric with the input shaft and circumscribed by an outer race, which is rigidly attached to the transmission case. Located inside the transmission case is a planetary gear set that includes a sun gear, which is concentric with and drivingly connected to the motor shaft of the second electric motor, a ring gear, which is concentric with the sun gear and drivingly connected to the transfer gear set, and a planet carrier, which is concentric with and drivingly connected to the input shaft. The planet carrier rotatably supports thereon multiple planet gears that are intermeshed with both the sun and ring gears. An inverted bearing mount device is packaged inside the transmission case, nested radially inside of the transfer gear set. The iBM device includes an annular outer disk with a cylindrical central hub that is integrally formed with and projects axially from the outer disk. An outer perimeter of the outer disk is rigidly attached to the ring gear, and an inner perimeter of the central hub is rigidly attached to the inner race of the first bearing.

Aspects of this disclosure are also directed to system control logic, workflow control protocols, and computer-readable media (CRM) for making or for using any of the herein-described vehicles, transmissions, and/or bearing mount devices. In an example, a method is presented for assembling an EVT assembly for an HEV, which includes an engine, first and second motors, multiple road wheels, and a final drive system drivingly connected to one or more of the road wheels. This representative method includes, in any order and in any combination with any of the above and below disclosed options and features: receiving a transmission case configured to mount to the hybrid vehicle; rotatably mounting an output shaft within the transmission case, the output shaft configured to drivingly connect to the final drive system; rotatably mounting an input shaft within the transmission case, the input shaft configured to drivingly connect to a crankshaft of the engine; rotatably mounting a transfer gear set within the transmission case, the transfer gear set drivingly connected to the output shaft and configured to drivingly connect to a first motor shaft of the first motor; mounting a first bearing concentric with the input shaft, the first bearing including a first inner race circumscribed by a first outer race; rigidly attaching the first outer race to the transmission case; locating a planetary gear set inside the transmission case, the planetary gear set including a sun gear concentric with and configured to drivingly connect to a second motor shaft of the second motor, a ring gear concentric with the sun gear and drivingly connected to the transfer gear set, and a planet carrier concentric with and drivingly connected to the input shaft. The planet carrier rotatably supporting thereon multiple planet gears that are intermeshed with the sun and ring gears; locating an iBM device inside the transmission case radially inward of the transfer gear set, the iBM device including an annular outer disk and a cylindrical central hub projecting axially from the outer disk; rigidly attaching the outer disk to the ring gear; and rigidly attaching the cylindrical central hub to the first inner race of the first bearing.

For any of the disclosed powertrains, vehicles, and methods, the iBM device, including the outer disk and central hub, may be integrally formed as a single-piece structure from a rigid metallic material (e.g., forged steel). As another option, an outer-diameter (OD) surface of the outer disk is rigidly attached (e.g., shrink fit) to an inner-diameter (ID) surface of the ring gear, whereas an OD surface of the central hub is rigidly attached (e.g., press fit) to an ID surface of the first bearing. The iBM device may optionally include a spacer ring that projects axially from the outer disk and circumscribes the central hub. This spacer ring, which may be integrally formed with the outer disk and central hub, presses against the inner race of the first bearing and thereby axially spaces the first bearing from the outer disk.

For any of the disclosed powertrains, vehicles, and methods, a second bearing may be rotatably mounted onto the input shaft; the central hub of the iBM device may be concentric with and rigidly attached to an outer race of the second bearing. In so doing, the iBM device's central hub is sandwiched between the first and second bearings. The iBM device may optionally include a retention ring that projects radially inward from the central hub and presses against the second bearing's outer race to thereby axially retain the second bearing inside the central hub. Like the spacer ring, the retention ring may be integrally formed with the iBM device's outer disk and central hub. In this instance, an OD surface of the central hub may be rigidly attached (e.g., press fit) to an ID surface of the first bearing, and an ID surface of the central hub may be rigidly attached (e.g., press fit) to an OD surface of the second bearing.

For any of the disclosed powertrains, vehicles, and methods, the transmission case may include a main housing with a front cover that is mounted onto the main housing and receives therethrough the input shaft. An annular gear pocket is located on the front cover, e.g., integrally formed with and projecting inward from the front cover's interior surface. The gear pocket rigidly attaches to the first bearing's outer race such that the first bearing nests inside the gear pocket. An optional annular bearing shim may be seated inside the gear pocket, sandwiched between the front cover and the outer race of the first bearing to thereby axially space the first bearing from the front cover. In this instance, the central hub may nest inside the gear pocket, radially interposed between the first bearing and the input shaft.

For any of the disclosed powertrains, vehicles, and methods, the outer disk of the iBM device may be axially interposed between the planet carrier and the first bearing and radially interposed between the ring gear and the input shaft. As a further option, the iBM device may have an L-shaped axial cross section with the cylindrical central hub projecting orthogonally from a radially inner perimeter of the annular outer disk. As a further option, the sun gear may be integrally formed with a terminal end of the motor shaft of first motor, the planet carrier may be splined onto the input shaft, and external teeth of the ring gear may be intermeshed with internal teeth of the transfer gear.

The above summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

Figure 1:
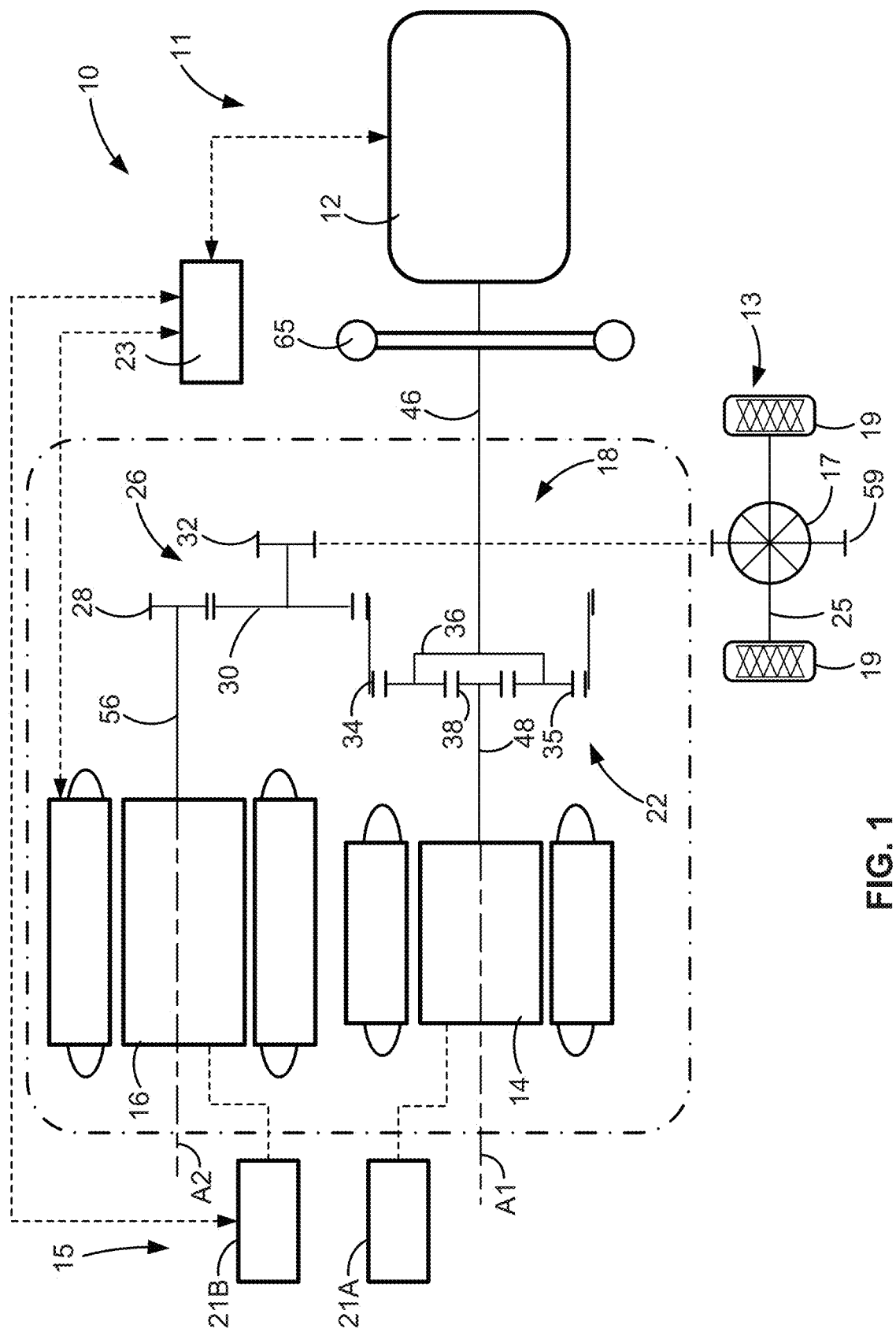
FIG. 1 is a schematic diagram of a representative two-motor, single-engine hybrid electric vehicle (HEV) powertrain architecture with a power-split electrically variable transmission (EVT) with which aspects of the present disclosure may be practiced.

The present disclosure is amenable to various modifications and alternative forms, and some representative embodiments of the disclosure are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, Brief Description of the Drawings, and Detailed Description sections, but not explicitly set forth in the claims, should not be incorporated into the claims, singly or collectively, by implication, inference or otherwise. Moreover, recitation of "first", "second", "third", etc., in the specification or claims is not per se used to establish a serial or numerical limitation; unless specifically stated otherwise, these designations may be used for ease of reference to similar features in the specification and drawings and to demarcate between similar elements in the claims.

For purposes of this disclosure, unless specifically disclaimed: the singular includes the plural and vice versa (e.g., indefinite articles "a" and "an" should generally be construed as meaning "one or more"); the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein to denote "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a representative motor vehicle, which is designated generally at 10 and portrayed herein for purposes of discussion as a hybrid electric automobile. The illustrated automobile 10—also referred to herein as "motor vehicle" or "vehicle" for short—is merely an exemplary application with which aspects of this disclosure may be practiced. In the same vein, incorporation of the present concepts into the illustrated power-split HEV EVT architecture should be appreciated as a non-limiting implementation of disclosed features. As such, it will be understood that aspects and features of this disclosure may be incorporated into other EVT configurations, may be implemented by other powertrain layouts, and may be incorporated into any logically relevant type of motor vehicle. Moreover, only select components of the representative motor vehicle and vehicle transmission are shown and described in detail herein. Nevertheless, the vehicles and transmissions discussed below may include numerous additional and alternative features, and other available peripheral hardware, for carrying out the various methods and functions of this disclosure.

Automobile 10 of FIG. 1 contains a hybrid-electric vehicle (HEV) powertrain 11 that is designed to provide vehicle launch and propulsion, to operate in all speed ranges between low and high road speeds, and to power the onboard vehicle electronics. In accord with a more specific, non-limiting example, powertrain 11 may be an extended range electric vehicle (EREV) powertrain with a variable-displacement 2.5-liter (L) four-cylinder internal combustion engine assembly 12 and two 120-kilowatt (kW) multiphase brushless permanent magnet (PM) motor/generator units (MGU) 14 and 16 that are mounted to a multi-speed, power-split electrically variable transmission (EVT) 18. An "electrically variable transmission," as shown in the drawings, comprises a transmission planetary gear train operatively connected to each of the engine 12, the first motor/generator unit (MGU) 14, and the second MGU 16. Channeling respective torques of the engine 12 and the two motor/generator units 14, 16 (referred to interchangeably as "traction motors") to different members of the planetary gear train permits one of the power sources to either assist or balance the operation of the other two power sources. Thus, the combination of an engine 12 and multiple motor/generator units 14, 16 operatively connected to the EVT 18 allows speeds and torques of the engine and motor/generators to be controlled and selected independently in order to power a subject vehicle 10 more efficiently.

The vehicle 10 is equipped with a vehicle battery system 15 that may comprise, for example, multiple battery cells arranged as battery modules that are stacked into multiple traction battery packs 21A and 21B. These battery cells may utilize suitable battery technology, including, for example, lead-acid, nickel-metal hydride (NiMH), lithium-ion ("Li-Ion"), Li-Ion polymer, zinc-air, lithium-air, nickel-cadmium (NiCad), valve-regulated lead-acid ("VRLA"), including absorbed glass mat ("AGM"), nickel-zinc (NiZn), molten salt (e.g., a Na—NiCl$_2$ battery), or combinations thereof. Each battery pack or each battery cell may be associated with one or more sensors to measure one or more battery characteristics (e.g., voltage, current, temperature, SOC, capacity, etc.) associated with each pack/cell. The vehicle battery system 15 is operatively connected to the first and second motor/generators units 14, 16 to transfer electrical current to and receive electrical current from these MGUs. Resident vehicle controller 23 is communicatively connected to the engine 12, traction motors 14, 16, vehicle battery system 15, and EVT 18 to control the operation thereof. Controller, control module, module, control unit, processor, and permutations thereof may be defined to mean one or various combinations of one or more of logic circuits, Application Specific Integrated Circuit(s) (ASIC), electronic circuit(s), central processing unit(s) (e.g., microprocessor(s)), and associated memory and storage (e.g., read only, programmable read only, random access, hard drive, tangible, etc.), combinational logic circuit(s), input/output circuit(s) and devices, etc., whether resident, remote, or a combination of both.

Vehicle controller 23 may be integrated circuit (IC) hardware programmed to execute one or more software or firmware programs or routines, e.g., using appropriate signal conditioning and buffer circuitry, and other components to provide the described functionality. Software, firmware, programs, instructions, routines, code, algorithms and similar terms may be defined to mean a controller-executable instruction sets, including calibrations and look-up tables. A controller may be designed with a set of control routines executed to provide one or more desired functions. Control routines are executed, such as by a central processing unit, and are operable to monitor inputs from sensing devices and other networked control modules and execute control and diagnostic routines to control operation of devices and actuators. Routines may be executed in real-time, continuously, systematically, sporadically and/or at regular intervals, for example, each 100 microseconds, 3.125, 6.25, 12.5, 25 and 100 milliseconds, etc., during ongoing vehicle use. Alternatively, routines may be executed in response to an occurrence of an event during operation of the vehicle 10.

Selectively operable as a continuously variable power transmission, EVT 18 of FIG. 1 includes a planetary gear set (PGS) 22 and a gear-train 26 and helps to define the input split hybrid powertrain 11 architecture. In this regard, the PGS 22 includes a ring gear 34, a planet carrier 36, and a sun gear 38. Multiple planet gears 35 are intermeshed with the ring gear 34 and mounted on the planet carrier member 36, while the sun gear 38 is intermeshed with the planet gear(s) 35 and concentrically aligned with the ring gear 34 such that the ring gear 34, and the planet gears 35 and the carrier member 36 rotate around an axis of rotation of the sun gear 38. In the illustrated example, the ring gear 34 of the PGS 22 includes a radially inner set of teeth intermeshed with the planet gears 35 located on a first portion of the ring gear 34 and a radially outer set of teeth in engagement with a transfer gear-train 26 located on a second portion of the ring gear 34.

As shown in FIG. 1, the engine 12 and the first motor/generator unit 14, or at least the respective torque-transmitting output shafts thereof, may be disposed for rotation on a common first axis of rotation A1. Conversely, the second motor/generator unit 16, or at least the torque-transmitting output shaft thereof, may be disposed for rotation on a second axis of rotation A2. According to the illustrated example, the first axis A1 is substantially parallel to and offset from the second axis A2. The gear-train 26 of FIG. 1 is configured to operatively connect the second motor/generator unit 16 to the PGS 22 at a corresponding junction point.

Engine 12, first MGU 14, and second MGU 16 are operatively connected to the EVT 18 via input member arrangements that transmit torque between the tractive power sources and the PGS 22. By way of non-limiting example, the input member arrangement includes: an engine output shaft of the engine 12, which serves as an engine input/output member 46; a rotor of the first MGU 14, which serves as a first motor input/output member 48; and a rotor of the second MGU 16, which serves as a second motor input/output member 56. The engine input/output member 46 provides engine torque to the EVT 18, whereas motor input/output members 48, 56 provide torque from their respective motor/generator units 14, 16 to the EVT 18. A damper assembly 65, which is operatively connected to the input/output shaft 46 of the engine 12, is configured to absorb torsional vibrations generated by the engine 12 before such vibrations can be transmitted to the PGS 22 of EVT 18.

Figure 2:
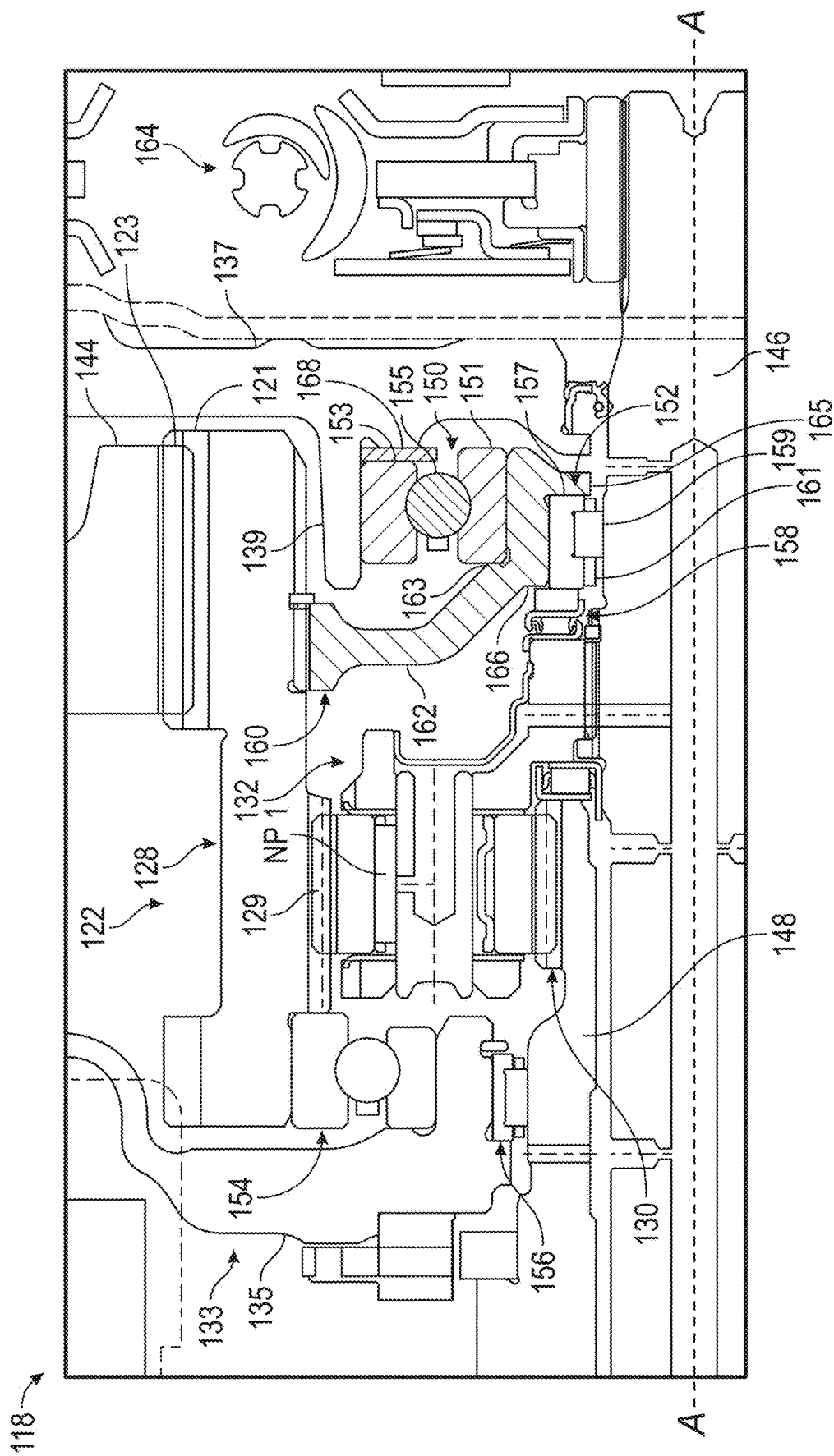
FIG. 2 is an enlarged, sectional side-view illustration of a portion of a representative power-split HEV EVT with a transfer gear supported on an inverted bearing mount for reduced bearing loss in accordance with aspects of the present disclosure.

The gear-train 26 includes a motor B pinion (MBP) 28 configured to rotate with the second motor input/output member 56 and the MBP 28 is in meshing engagement with a transfer gear 30. The transfer gear 30 is supported for rotation on a final drive pinion (FDP) 32. As shown in FIG. 2, the transfer gear 30 includes teeth 31 in meshing engagement with radially outer teeth 37 on the ring gear 34.

The EVT 18 also includes a final drive ring (FDR) 59 shown in direct mechanical engagement with the FDP 32 with a dashed line for ease of illustration. To propel the vehicle 10, the FDP 32 and the FDR 59 transmits torque to a final drive system 13, which is represented herein by differential 17, drive wheels 19 and axle 25. Regenerative braking may be achieved by transferring torque from the final drive system 13 to the MGUs 14, 16 when operating in an electric generator mode.

In the example depicted in FIG. 1, the engine 12 may be an available or hereafter developed engine, such as a two or four-stroke compression-ignited diesel engine or a four-stroke spark-ignited gasoline or flex-fuel engine, which is readily adapted to provide its available power output typically at a number of revolutions per minute (RPM). Although not explicitly portrayed in FIG. 1, it should be appreciated that the final drive system 13 may take on an available configuration, including front wheel drive (FWD) layouts, rear wheel drive (RWD) layouts, four-wheel drive (4WD) layouts, all-wheel drive (AWD) layouts, etc.

During operation of a vehicle transmission, the torque carrying capacity of an internal bearing may degrade over its operational life due to the inherently high-friction and high-speed nature of its operation, which may lead to an increase of energy lost to heat, also known as "bearing loss." To mitigate such bearing loss, disclosed hybrid vehicle transmissions contain a bearing mount that structurally supports the intermeshed ring gear and transfer gear assembly on two concentric rolling bearings, one of which is supported on the transmission housing and one on the engine-side input shaft. For instance, the bearing mount (also referred to as "inverted bearing mount" or "iBM") may be packaged inside the transmission housing and coupled to a support (ball) bearing, which is mounted to the transmission case and supports the transfer gear via the bearing's inner race. The iBM feature may be roughly L-shaped in cross section and may be located radially inward from the surrounding transfer gear. Moreover, the iBM feature may be integral with the ring gear (e.g., a common forging) or could be a separate part that is rigidly attached to the ring gear (e.g., press, slip, or shrink fit, welding, splined, fastened, adhered, or a combination of these). The iBM feature may have two diametral surfaces that are finished to interface with two bearings: (a) an outside-diameter (OD) surface that interfaces with the inner race of the support bearing, which supports the iBM and thereby supports the transfer gear set; and (b) an inner-diameter (ID) surface that interfaces with a shaft (cylindrical roller) bearing, which supports the input shaft of the transmission.

By housing the shaft bearing that supports the transmission's input shaft, the bearing mount reduces the relative speed of that bearing and, consequently, any attendant bearing loss. The finished ID surface of the roughly L-shaped iBM feature may enable this high-speed cylindrical roller bearing to be installed, e.g., by press-fitting, into the flange cavity. By installing the input-shaft support bearing in this location, as compared to, for example, in the case of the transmission, the relative speed between the bearing races may be reduced for the majority of engine-on operation, since the input member and the output member of the transmission (i.e., the transfer gear through the iBM feature) may rotate in the same direction when the engine is on and the vehicle is in forward motion.

In addition to reducing bearing loss of the shaft bearing and structurally supporting the intermeshed ring and transfer gears, the bearing mount may also function to increase the moment of inertia of a radially inward section of the ring and transfer gears with a concomitant increase in stiffness of the transfer gear. The moment of inertia of a rectangular section of a gear about a neutral axis is a function of the dimension of the base multiplied by the cube power of its height. Through its structural interface with the ring gear at a point radially aligned with the transfer gear, the iBM extension feature increases a relative height, h, of the transfer gear; the iBM and transfer gear are interconnected such that the two parts structurally act as one. This results in a measurable increase in the stiffness of the combined part such that deflection under loads applied by gear meshes, including the transfer gear mesh and the pinion meshes associated with the planetary gear set, supporting bearings, and the park gear, are lower than they would be without the bearing mount feature.

FIG. 2 presents a sectional side-view illustration of a representative power-split HEV EVT 118 that provides reduced bearing loss at the engine-shaft support bearing, increased stiffness of the transfer gear set, and improved structural support at the intermeshed ring and transfer gear assembly. Those skilled in the art will appreciate that only a portion of the HEV EVT 118—a torque input section above a central axis of rotation A-A—is visible in FIG. 2; the section immediately below the axis of rotation A-A, while not visible, may be a mirror image of the portion shown. Additionally, while presented as a single-mode power-split eCVT, it is envisioned that aspects and features of the HEV EVT 118 of FIG. 2 may be incorporated, singly and collectively, into the hybrid transmission 18 of FIG. 1, and vice versa. As a non-limiting point of overlap, the HEV EVT 118 of FIG. 2 includes a protective transmission case 133 that supports the working hardware of the vehicle powertrain and mounts to a vehicle body, for example, via bracket, bushings, and bolts that secure the case to a transmission mount on the vehicle chassis. The transmission case 133 is represented in FIG. 2 by a bowl-shaped main housing (central support) 135 with a complementary front cover (bell housing casting) 137 that is mounted, e.g., via hex-head bolts, onto an engine-facing open end of the main housing 135.

HEV transmission 118 of FIG. 2, like the HEV EVT 18 of FIG. 1, contains an output shaft (e.g., transmission output shaft of FIG. 1) that drivingly connects to a vehicle drivetrain (e.g., final drive system 13 of FIG. 1) to transmit tractive torque to a vehicle's road wheels (e.g., drive wheels 19). Also rotatably mounted inside the transmission case 133 is an engine-side (ICE) input shaft 146 that passes through the front cover 137 and drivingly connects to an engine output member (e.g., engine crankshaft of FIG. 1) via a coaxially aligned torsional damper assembly 164 and crankshaft hub (not visible). A motor-side (Motor A) input shaft 148 of a "small" MGU passes through the central support segment of the main housing 135 to drivingly connect the MGU to the EVT 118 and thereby enable the back-and-forth exchange of rotational power. According to the illustrated example, the ICE input shaft 146 passes through and rotates inside of the motor input shaft 148. Radially offset from and parallel to the two concentric input shafts 146, 148 is a transfer gear set 144 that drivingly connects (e.g., via splined engagement) a motor-side (Motor B) input shaft (e.g., motor stator shaft of FIG. 1) of a "large" second MGU to thereby drivingly connect the MGU to the EVT 118 and thereby enable the back-and-forth exchange of rotational power.

Multiple radial support bearings provide rotational support for the various torque-transmitting shafts of the EVT 118 of FIG. 2. As an example, there are four radial rolling-type bearings visible in FIG. 2: (1) an engine-side, high-speed, deep-groove ball (first) bearing 150, (2) an engine-side, high-speed, caged cylindrical roller (second) bearing 152, (3) a motor-side, high-speed, deep-groove ball (third) bearing 154, and (4) an engine-side, high-speed, caged cylindrical roller (fourth) bearing 156. The first and second bearings 150, 152 are concentric with each other and with the ICE input shaft 146, whereas the third and fourth bearings 154, 156 are concentric with each other and with the ICE and motor input shafts 146, 148. The third bearing 154 rotatably mounts a motor-side axial end of a ring gear 128 onto an OD surface of an inward projecting lip of the main housing 135. Comparatively, the fourth bearing 156 rotatably mounts an engine-side axial end of the motor input shaft 148 onto an ID surface of the same inward projecting lip of the main housing 135. It should be appreciated that each of the illustrated bearing assemblies may take on other suitable bearing configurations, including needle, tapered-roller, thrust ball, etc., without departing from the intended scope of this disclosure.

With continuing reference to FIG. 2, the first bearing 150 is a ball-type rolling bearing that includes a grooved annular inner race 151, a grooved annular outer race 153 that circumscribes and is coaxial with the inner race 151, and a series of circumferentially spaced bearing balls 155 slidably interposed between the inner and outer races 151, 153. The outer race 153 of the first bearing 150 is rigidly attached (e.g., press fit) to the front cover 137 of the transmission case 133. The second bearing 152, in contrast, is a roller-type rolling bearing that includes an annular outer race 157, a series of circumferentially spaced cylindrical rollers 159 slidably interposed between the outer race 157 and the ICE input shaft 146, and a slotted roller cage 161 that maintains the axial alignment and circumferential spacing of the rollers 159. An axial end of the second bearing 152 seats against a thrust bearing 158.

Located inside the transmission case's main housing 135 is an epicyclic "planetary gear" set 122 that functions to drivingly connect the HEV's three prime movers to one another and to the HEV's final drive system. Similar to the PGS 22 of FIG. 1, the planetary gear set 122 of FIG. 2 is composed of a ring gear member 128, a planet carrier member 130, and a sun gear member 132. Circumferentially spaced planet gears 129 are rotatably mounted onto the planet carrier 130 and intermeshed with both the ring gear 128 and the sun gear 132. With this arrangement the sun gear 132 is circumscribed by and concentrically aligned with the ring gear 128 to both rotate about a common axis A-A with the planet carrier 130. In addition, the sun gear 132 is concentric with and drivingly connected to the motor input shaft 148 (e.g., integrally formed onto a distal end of the shaft), the ring gear 128 is drivingly connected to the transfer gear set 144 (e.g., via intermeshed OD ring gear teeth 121 and ID transfer gear teeth 123). The intermediate planet carrier assembly 130 is drivingly connected to the ICE input shaft 146 (e.g., via splined engagement).

Reduced bearing loss and increased transfer gear stiffness is provided by an inverted bearing mount (iBM) device 160 that is packaged inside the transmission case 133, located radially inward of the transfer gear set 144 and nested inside of the central annulus cavity of the ring gear 128 of FIG. 2. This bearing mount device 160 may have a hat-like shape that is composed of an annular outer disk 162 with a cylindrical central hub 166 that projects axially from the outer disk 162. The outer disk 162 may extend radially inward from the ring gear 128 and circumscribes the input shaft 146. The central hub 166, on the other hand, extends axially along and circumscribes the input shaft 146. For simplicity of manufacture and installation, it may be desirable that the iBM device 160, including the outer disk 162 and central hub 166, be integrally formed as a unitary, one-piece structure from a rigid metallic material (e.g., forged steel).

The iBM device 160 of FIG. 2 structurally connects the ring gear 128 to the first and second bearings 150, 152 such that the ring 128 and transfer gear set 144 are supported on the two bearings 150, 152 and the transmission case 133. In particular, an OD surface on the outer periphery of the outer disk 162 is rigidly attached (e.g., splined) to an ID surface on the inner periphery of the ring gear 128. An OD surface on the outer periphery of the central hub 166 is rigidly attached (e.g., interference fit) to an ID surface on the inner periphery of the first bearing's inner race 151. The iBM device 160 may be fabricated with an optional spacer ring 163 that projects axially from the outer disk 162 and circumscribes the central hub 166. This toroidal spacer ring 163, which may be integrally formed with both the outer disk 162 and central hub 166, presses against the inner race 151 of the first bearing 150. In this manner, the spacer ring 163 axially space the first bearing 150 from the outer disk 162 such that neither the outer race 153 nor the bearing balls 155 has direct physical contact with the bearing mount 160.

To rotatably mount the input shaft 146 onto the transmission case 133, the central hub 166 of the iBM device 160 may be concentric with and rigidly attached to the outer race 157 of the second bearing 152. In so doing, the iBM device's central hub 166 is sandwiched between the first and second bearings 150, 152. An optional retention ring 165 may be integrally formed with and project radially inward from the central hub 166. This annular retention ring 165 presses against the second bearing's outer race 157 to thereby axially retain the second bearing 152 inside the central hub 166. In this instance, an OD surface of the central hub 166 may be rigidly attached (e.g., press or slip fit) to an ID surface of the first bearing's inner race 151, and an ID surface of the central hub 166 may be rigidly attached (e.g., press or slip fit) to an OD surface of the second bearing's outer race 157.

An annular gear pocket 139 may be disposed inside the transmission case 133, e.g., integrally formed with and facing inward from the interior surface of the front cover 137, to structurally interface the transmission case 133 with the bearing mount 160. According to the illustrated example, the gear pocket 139 includes an annular outer wall that rigidly attaches (e.g., via press fit) to the first bearing's outer race 153 such that the first bearing 150 nests inside the gear pocket 139. An optional annular bearing shim 168 may also be seated inside this gear pocket 139, sandwiched between the transmission case's front cover 137 and the outer race 153 of the first bearing 150 to thereby axially space the inner race 151 and bearing balls 155 of the first bearing 150 from the front cover 137. In this instance, the iBM's central hub 166 may nest inside the gear pocket 139, radially interposed between the first bearing 150 and the input shaft 146.

It may be desirable that the entire iBM device 160 be packaged between the planetary gear set 122 and the front cover 137 such that the iBM's outer disk 162 is both axially interposed between the planet carrier 130 and the first bearing 150 and radially interposed between the ring gear 128 and the ICE input shaft 146. As best seen in the sectional side-view illustration of FIG. 2, the iBM device 160 may have a generally L-shaped axial cross section with the cylindrical central hub 166 projecting orthogonally from a radially inner perimeter of the annular outer disk 162. It is envisioned that the shape, size, and location of the iBM device 160 of FIG. 2 may be varied from what is shown in the drawings to accommodate other intended applications and attendant packaging constraints. It is also envisioned that the iBM device 160 may be fabricated as a standalone component that is mechanically interfaced with the ring gear 128 and support bearing 150 (as shown) or, alternatively, may be integrally formed with one or both of the gear 128 and bearing 150.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. An electrically variable transmission (EVT) assembly for a hybrid vehicle, the hybrid vehicle including an engine, first and second motors, multiple road wheels, and a final drive system drivingly connected to one or more of the road wheels, the EVT assembly comprising:
  a transmission case configured to mount to the hybrid vehicle;
  an output shaft rotatable within the transmission case and configured to drivingly connect to the final drive system;
  an input shaft rotatable within the transmission case and configured to drivingly connect to a crankshaft of the engine;
  a transfer gear set rotatable within the transmission case, drivingly connected to the output shaft, and configured to drivingly connect to a first motor shaft of the first motor;
  a first bearing concentric with the input shaft and including a first inner race circumscribed by a first outer race rigidly attached to the transmission case;
  a planetary gear set located inside the transmission case and including a sun gear concentric with and configured to drivingly connect to a second motor shaft of the second motor, a ring gear concentric with the sun gear and drivingly connected to the transfer gear set, and a planet carrier concentric with and drivingly connected to the input shaft, the planet carrier rotatably supporting thereon multiple planet gears intermeshed with the sun gear and the ring gear; and
  an inverted bearing mount (iBM) device located inside the transmission case radially inward of the transfer gear set, the IBM device including an annular outer disk rigidly attached to the ring gear, and a cylindrical central hub projecting axially from the outer disk and rigidly attached to the first inner race of the first bearing.

2. The EVT assembly of claim 1, wherein the iBM device, including the outer disk and the central hub, is integrally formed as a single-piece structure from a rigid metallic material.

3. The EVT assembly of claim 1, wherein an outer-diameter (OD) disk surface of the outer disk is rigidly attached to an inner-diameter (ID) gear surface of the ring gear, and an OD hub surface of the central hub is rigidly attached to an ID bearing surface of the first bearing.

4. The EVT assembly of claim 1, wherein the iBM device further includes a spacer ring projecting axially from the outer disk and circumscribing the central hub, the spacer ring pressing against the first inner race and thereby spacing the first bearing from the outer disk.

5. The EVT assembly of claim 1, further comprising a second bearing rotatably mounted onto the input shaft, wherein the central hub is concentric with and rigidly attached to a second outer race of the second bearing.

6. The EVT assembly of claim 5, wherein the iBM device further includes a retention ring projecting radially inward from the central hub, the retention ring pressing against the second outer race and thereby axially retaining the second bearing inside the central hub.

7. The EVT assembly of claim 5, wherein an outer-diameter (OD) hub surface of the central hub is rigidly attached to an inner-diameter (ID) bearing surface of the first bearing, and an ID hub surface of the central hub is rigidly attached to an OD bearing surface of the second bearing.

8. The EVT assembly of claim 1, wherein the transmission case includes a main housing, a front cover mounted onto the main housing and receiving therethrough the input shaft, and an annular gear pocket located on an interior surface of the front cover and rigidly attached to the first outer race such that the first bearing nests inside the gear pocket.

9. The EVT assembly of claim 8, further comprising an annular bearing shim seated inside the gear pocket and sandwiched between the front cover and the first outer race of the first bearing.

10. The EVT assembly of claim 8, wherein the central hub nests inside the gear pocket radially interposed between the first bearing and the input shaft.

11. The EVT assembly of claim 1, wherein the outer disk of the iBM device is axially interposed between the planet carrier and the first bearing and radially interposed between the ring gear and the input shaft.

12. The EVT assembly of claim 1, wherein the iBM device has an L-shaped axial cross section with the central hub projecting orthogonally from a radially inner end of the outer disk.

13. A hybrid electric vehicle comprising:
  a vehicle body;
  a plurality of road wheels attached to the vehicle body;
  an internal combustion engine (ICE) assembly attached to the vehicle body and including a crankshaft configured to output engine torque generated by the ICE assembly;
  first and second electric motors attached to the vehicle body and including first and second motor shafts, respectively, configured to output motor torque generated by the first and second electric motors;
  a final drive system drivingly connected to one or more of the road wheels; and
  an electrically variable transmission (EVT) assembly, including:
    a transmission case mounted inside the vehicle body;
    an output shaft rotatable within the transmission case and drivingly connected to the final drive system;

an input shaft rotatable within the transmission case and drivingly connected to the crankshaft of the ICE assembly;

a transfer gear set rotatable within the transmission case, drivingly connected to the output shaft, and drivingly connected to the first motor shaft of the first electric motor;

a first bearing concentric with the input shaft and including a first inner race circumscribed by a first outer race rigidly attached to the transmission case;

a planetary gear set located inside the transmission case and including a sun gear concentric with and drivingly connected to the second motor shaft of the second electric motor, a ring gear concentric with the sun gear and drivingly connected to the transfer gear set, and a planet carrier concentric with and drivingly connected to the input shaft, the planet carrier rotatably supporting thereon multiple planet gears intermeshed with the sun gear and the ring gear; and an inverted bearing mount (iBM) device located in the transmission case radially inside of the transfer gear set, the iBM device including an annular outer disk and a cylindrical central hub integrally formed with and projecting axially from the outer disk, the outer disk rigidly attached to the ring gear, and the central hub rigidly attached to the first inner race of the first bearing.

14. A method of assembling an electrically variable transmission assembly for a hybrid vehicle, the hybrid vehicle including an engine, first and second motors, multiple road wheels, and a final drive system drivingly connected to one or more of the road wheels, the method comprising:

receiving a transmission case configured to mount to the hybrid vehicle;

rotatably mounting an output shaft within the transmission case, the output shaft configured to drivingly connect to the final drive system;

rotatably mounting an input shaft within the transmission case, the input shaft configured to drivingly connect to a crankshaft of the engine;

rotatably mounting a transfer gear set within the transmission case, the transfer gear set drivingly connected to the output shaft and configured to drivingly connect to a first motor shaft of the first motor;

mounting a first bearing concentric with the input shaft, the first bearing including a first inner race circumscribed by a first outer race;

rigidly attaching the first outer race to the transmission case;

locating a planetary gear set inside the transmission case, the planetary gear set including a sun gear concentric with and configured to drivingly connect to a second motor shaft of the second motor, a ring gear concentric with the sun gear and drivingly connected to the transfer gear set, and a planet carrier concentric with and drivingly connected to the input shaft, the planet carrier rotatably supporting thereon multiple planet gears intermeshed with the sun gear and the ring gear;

locating an inverted bearing mount (iBM) device inside the transmission case radially inward of the transfer gear set, the iBM device including an annular outer disk and a cylindrical central hub projecting axially from the outer disk;

rigidly attaching the outer disk to the ring gear; and rigidly attaching the cylindrical central hub to the first inner race of the first bearing.

15. The method of claim 14, further comprising integrally forming the iBM device, including the outer disk and the central hub, as a single-piece structure from a rigid metallic material.

16. The method of claim 14, wherein an outer-diameter (OD) disk surface of the outer disk is rigidly attached to an inner-diameter (ID) gear surface of the ring gear, and an OD hub surface of the central hub is rigidly attached to an ID bearing surface of the first bearing.

17. The method of claim 14, wherein the iBM device further includes a spacer ring projecting axially from the outer disk and circumscribing the central hub, the spacer ring pressing against the first inner race and thereby spacing the first bearing from the outer disk.

18. The method of claim 14, further comprising:

rotatably mounting a second bearing onto the input shaft; and rigidly attaching the central hub to a second outer race of the second bearing such that the central hub is concentric with the second bearing.

19. The method of claim 18, wherein the iBM device further includes a retention ring projecting radially inward from the central hub, the retention ring pressing against the second outer race and thereby axially retaining the second bearing inside the central hub.

20. The method of claim 14, wherein the transmission case includes a main housing, a front cover mounted onto the main housing and receiving therethrough the input shaft, and an annular gear pocket located on an interior surface of the front cover and rigidly attached to the first outer race such that the first bearing nests inside the gear pocket.

* * * * *